(12) United States Patent
Jiang et al.

(10) Patent No.: US 12,389,919 B1
(45) Date of Patent: Aug. 19, 2025

(54) SMART INFUSION SYSTEM, DEVICE, AND METHOD

(71) Applicant: Meta 9 Limited, Central (HK)

(72) Inventors: Yanzhe Jiang, Shanghai (CN); Xiao Zhang, Shenzhen (CN)

(73) Assignee: Meta 9 Limited, Central (HK)

( * ) Notice: Subject to any disclaimer, the term of this patent is extended or adjusted under 35 U.S.C. 154(b) by 0 days.

(21) Appl. No.: 18/945,219

(22) Filed: Nov. 12, 2024

Related U.S. Application Data

(63) Continuation of application No. 18/779,556, filed on Jul. 22, 2024.

(30) Foreign Application Priority Data

| Mar. 29, 2024 | (CN) | .................. 202410373051.2 |
| May 9, 2024 | (CN) | .................. 202420998073.3 |
| May 9, 2024 | (CN) | .................. 202421003123.6 |

(51) Int. Cl.
| A23B 2/97 | (2025.01) |
| A23B 2/00 | (2025.01) |
| A23L 5/30 | (2016.01) |
| H05B 6/72 | (2006.01) |
| H05B 6/78 | (2006.01) |

(52) U.S. Cl.
CPC ............... *A23B 2/97* (2025.01); *A23B 2/001* (2025.01); *A23L 5/34* (2016.08)

(58) Field of Classification Search
CPC .. A23B 2/97; A23B 2/001; A23L 5/34; H05B 6/72; H05B 6/78; H05B 6/64

USPC ........ 219/702, 679, 680, 690, 704, 708, 710, 219/711, 712, 713, 716, 723, 7, 25, 739, 219/756, 757, 746, 748; 426/231

See application file for complete search history.

(56) References Cited

U.S. PATENT DOCUMENTS

| 5,036,172 A | * | 7/1991 | Kokkeler | ............. H05B 6/6452 374/149 |
| 5,986,249 A | * | 11/1999 | Yoshino | ................. H05B 6/688 219/754 |
| 6,730,895 B2 | * | 5/2004 | Kim | ..................... H05B 6/6479 219/754 |
| 2007/0095823 A1 | * | 5/2007 | Sedlmayr | ................. H05B 6/72 219/688 |
| 2010/0213187 A1 | * | 8/2010 | Bandholz | ............. H05B 6/6441 219/506 |

FOREIGN PATENT DOCUMENTS

| DE | 4318207 A1 * | 12/1993 | ............. A23L 3/365 |
| JP | 3485886 B2 * | 1/2004 | |
| JP | 2004219055 A * | 8/2004 | ............. G01G 19/56 |

* cited by examiner

*Primary Examiner* — Quang T Van
(74) *Attorney, Agent, or Firm* — Leydig, Voit & Mayer, Ltd.

(57) ABSTRACT

A home appliance is provided for substance processing using microwave. The home appliance includes a temperature sensor, a microwave generator configured to generate microwave, and a controller coupled to the temperature sensor and the microwave generator. The controller is configured to control an operation of the microwave generator based on a measurement of the temperature sensor for processing the substance.

9 Claims, 10 Drawing Sheets

SMART INFUSION SYSTEM, DEVICE, AND METHOD

CROSS-REFERENCE OF RELATED APPLICATIONS

The application is a continuation of U.S. application Ser. No. 18/779,556, filed on Jul. 22, 2024, which claims foreign priorities to Chinese Application No. 202410373051.2, filed on Mar. 29, 2024, Chinese Application No. 202421003123.6, filed on May 9, 2024, and Chinese Application No. 202420998073.3, filed on May 9, 2024. All of the aforementioned applications are hereby incorporated by reference in their entireties.

FIELD

The present disclosure relates to an electronic system/device, and more particularly, for drying, extracting, or transforming materials.

BACKGROUND

Current household herbal extractors commonly use electric heating. Generally, household herbal extractors heat the container to the desired temperature and maintain the temperature of the container for an extended period to facilitate the extraction process. Plant components submerged in the medium gradually release their extracts into the solution. However, conventional methods are time-consuming, often taking in excess of two hours, and are not efficient for quickly extracting high concentrations of plant components.

Due to the limitations in existing technologies, there is a need for developing techniques for more efficient extraction or similar applications suitable for household use scenarios.

SUMMARY

A first aspect of the present disclosure provides a home appliance for substance processing using microwave comprising: a temperature sensor; a microwave generator configured to generate microwave; and a controller coupled to the temperature sensor and the microwave generator and configured to control an operation of the microwave generator based on a measurement of the temperature sensor for processing the substance, In an embodiment, the home appliance further comprises a weighing sensor coupled to the controller, wherein the controller is further configured to control an operation of the microwave generator based on a measurement of the weighing sensor for processing the substance.

In an embodiment, the home appliance further comprises a motor coupled to the controller and configured to drive a rotor placed inside the substance, wherein the controller is further configured to adjust, based on at least one of the measurement of the weighing sensor and the measurement of the temperature sensor, a rotational speed of the rotor through the motor.

In an embodiment, the home appliance further comprises: a main body providing a chamber with a side opening, wherein the microwave generator is situated beneath the chamber, and the substance is placed inside the chamber during process; a door fixed on a first side frame of the main body, wherein the door can be closed to cover the side opening of the chamber in the main body; a waveguide integrated in a rear frame of the main body, the waveguide being connected to the microwave generator and configured to direct the microwaves into the chamber through an output port located at a rear surface of the chamber; and a weighing sensor integrated in the main body, wherein the temperature sensor is removably attachable to a first side surface of the chamber, and the first side surface of the chamber is an interior surface of the first side frame of the main body, and wherein the controller is integrated in the main body and configured to: obtain measurements from the weighing sensor and the temperature sensor; and adjust, based on the measurements, the operation of the microwave generator.

In an embodiment, the home appliance further comprises: a motor situated beneath the chamber and proximate to a bottom surface of the chamber, wherein the motor is configured to drive a rotor when the rotor is placed inside the chamber, and wherein the controller is further configured to adjust, based on the measurements, a rotational speed of the rotor through the motor.

In an embodiment, the home appliance further comprises: one or more cooling fans adjacent to the microwave generator and configured to dissipate heat from the microwave generator.

In an embodiment, the home appliance further comprises: a two-step door locking mechanism integrated in a second side frame of the main body, wherein the second side frame and the first side frame are on opposite sides of the main body.

In an embodiment, wherein the weighing sensor is integrated in a top frame of the main body.

In an embodiment, wherein the controller further comprises: one or more processors; a memory storing instructions executable by the one or more processors; and a transceiver configured to receive parameter models associated with one or more recipes, wherein the memory is configured to store the parameter models associated with one or more recipes, and wherein the one or more processors are configured to: determine, for the substance, a set of parameters corresponding to a parameter model associated with a recipe of the one or more recipes; and determine, based on the measurements, an adjustment to one or more parameters in the set of parameters for processing the substance.

In an embodiment, wherein the main body comprises an opening in a top frame, the opening serves as a channel, allowing air communication between inside and outside the chamber, and wherein the opening does not allow the microwaves to pass through.

In an embodiment, the home appliance further comprises: a condenser connected to the main body through the opening, wherein the condenser is configured to collect steam from the chamber.

In an embodiment, the home appliance for substance processing using microwave comprises: a main body providing a chamber with a side opening; a door fixed on a first side frame of the main body, wherein the door can be closed to cover the side opening of the chamber in the main body; a microwave generator situated beneath the chamber and configured to generate microwaves for heating the substance placed in the chamber; a waveguide integrated in a rear frame of the main body, the waveguide being connected to the microwave generator and configured to direct the microwaves into the chamber through an output port located at a rear surface of the chamber; a weighing sensor integrated in the main body; one or more temperature sensors removably attached to a first side surface of the chamber; and a control circuitry integrated in the main body and configured to: obtain measurements from the weighing sensor and the one or more temperature sensors connected to the chamber; and adjust, based on the measurements, operations of the microwave generator.

A second aspect of the present disclosure provides a method for processing substance using a home appliance, comprising: generating microwave, using a microwave generator, to heat a substance disposed within the home appliance; receiving a temperature measurement from a temperature sensor disposed within the home appliance; and controlling an operation of the microwave generator based in part on the temperature measurement.

In an embodiment, the method further comprises: determining, based on a selected mode of the home appliance, a set of parameters for controlling the operation of the microwave generator; receiving a weight measurement from a weighing sensor disposed within the home appliance; adjusting, based on the weight measurement, one or more parameters of the set of parameters; and controlling the operation of the microwave generator based on the set of parameters comprising the one or more adjusted parameters.

In an embodiment, wherein the set of parameters comprises a parameter for controlling an operation of a motor disposed within the home appliance, wherein the motor is configured to drive a rotor to stir the substance, the method further comprises: controlling an operation of the motor based on the set of parameters comprising the one or more adjusted parameters.

In an embodiment, the method further comprises: receiving temperature measurements from the temperature sensor; and dynamically adjusting the operation of the microwave generator or the motor.

In an embodiment, wherein the home appliance is prestored with a plurality of recipes, and wherein the set of parameters are associated with a recipe of the plurality of recipes.

A third aspect of the present disclosure provides a container for drying a sample, comprising: a body providing a cavity with an opening; a cover configured to enclose the opening of the cavity of the body, the cover comprising a plurality of through holes, wherein the plurality of through holes allows steam to pass through but prevents microwaves from entering the enclosed cavity of the body; and a removable sample holder placed in the cavity of the body configured to hold a sample for drying, wherein at least a portion of the body comprises absorbing material that generates heat by absorbing microwave energy.

In an embodiment, wherein the body comprises a metal part, wherein the cover comprises a metal part and an edge that is made of an insulating material, and wherein the edge of the cover spaces the metal part of the cover from the metal part of the body.

In an embodiment, wherein at least one through hole of the plurality of through holes are configured to allow insertion of a temperature sensor probe.

In an embodiment, the container further comprises: a removable mesh part configured to hold a substance for process and space the substance from a bottom wall or a side wall of the cavity; and a rotor disposed at the bottom of the cavity and driven by a motor outside the cavity, wherein the rotor is configured to promote air circulation within the cavity.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
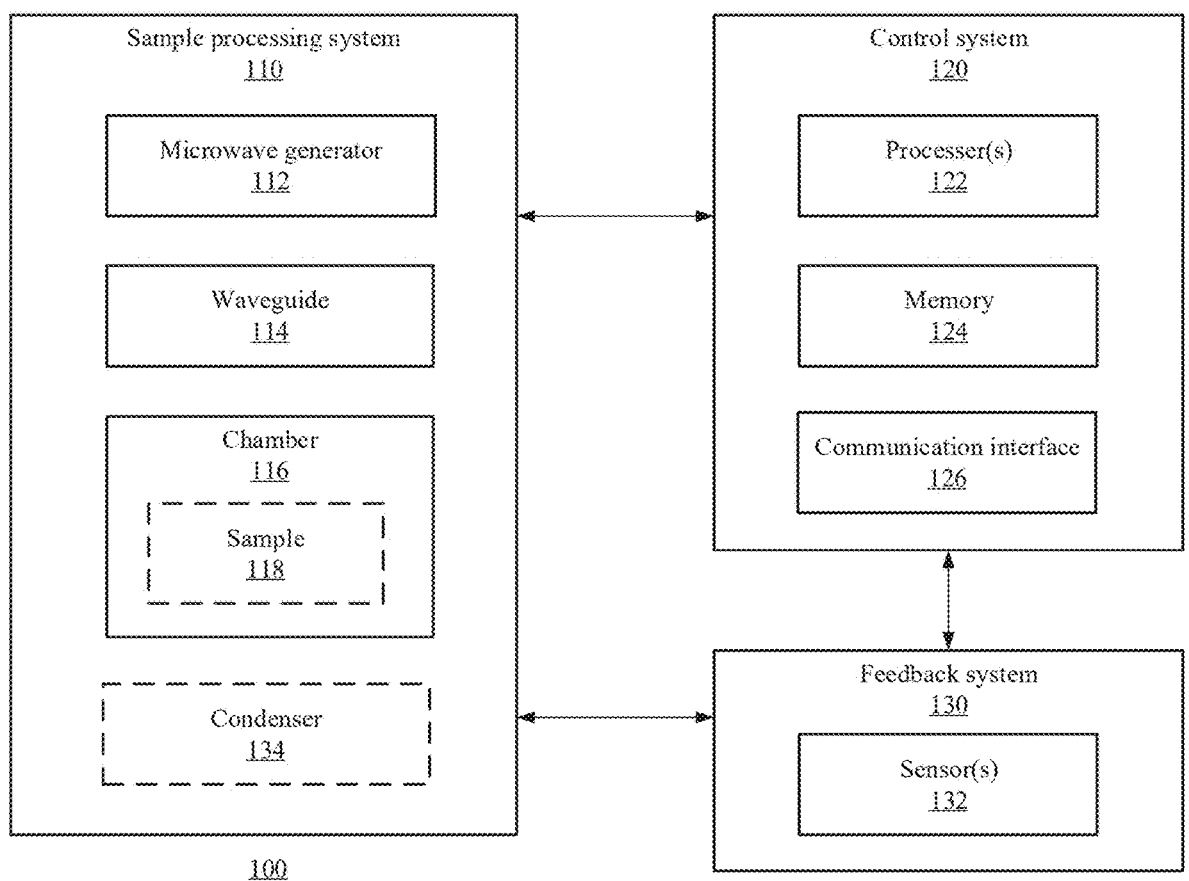
FIG. 1 is a simplified block diagram of an infusion system, according to one or more embodiments of the present disclosure.

The present disclosure provides compact yet powerful extractor systems/devices capable of controlling their operations based on feedback control, thereby achieving precise control over the device and efficient operation for optimized performance.

In particular, exemplary aspects of the infusion systems according to the present disclosure are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

FIG. 1 illustrates a simplified block diagram of an infusion system 100, according to one or more embodiments of the present disclosure. Each block can include one or more suitable hardware and/or software components to facilitate the functions disclosed therein. The term "infuse," "infusing" and "infusion" refer to the process of heating, drying, extracting, and/or transforming a substance such as herb, vegetable, or plant, as described hereinafter. According to an embodiment, the system 100 can be a home appliance, such as a standalone table-top unit or a wall unit installed in a home kitchen for personal or family use. According to another embodiment, the system 100 can be an industrial unit installed in a restaurant, hotel, laboratory, hospital, etc., for commercial use. Regardless of the setting, the system 100 has a compact size that is easily moved and installed.

The system 100 includes various components configured to process a sample 118 placed therein. A "sample" refers to any substance to be processed by the system 100 using the energy generated therein. The substance can be of any suitable form, including solid, solution, and more. Processing the sample can include, but is not limited to, drying, distillation, and more. As will be discussed hereafter, the sample 118 can be placed directly inside the system 100 or in a container (e.g., a canister), which is then placed together with the container in the system 100.

Referring to FIG. 1, various subsystems in the system 100 are configured to operation in conjunction with other components/subsystems to perform the operations disclosed herein. The subsystems include a sample processing system 110, a control system 120, and a feedback system 130.

In the sample processing system 110, a microwave generator 112 is configured to produce energy in wave form. For example, the microwave generator 112 can include a component (e.g., a magnetron) that converts electrical energy into microwaves. A waveguide 114 directs the generated microwaves into a chamber 116, where the sample is placed. The chamber 116 confines the generated microwaves, resulting in a spatial distribution of microwave energy inside. For example, as the microwaves propagate within the chamber 116, these waves bounce off the walls of the chamber 116, forming standing waves with nodes and antinodes. The chamber 116 is an interior space within a housing that integrates the components of the system 100 into its frame.

Figure 2A:
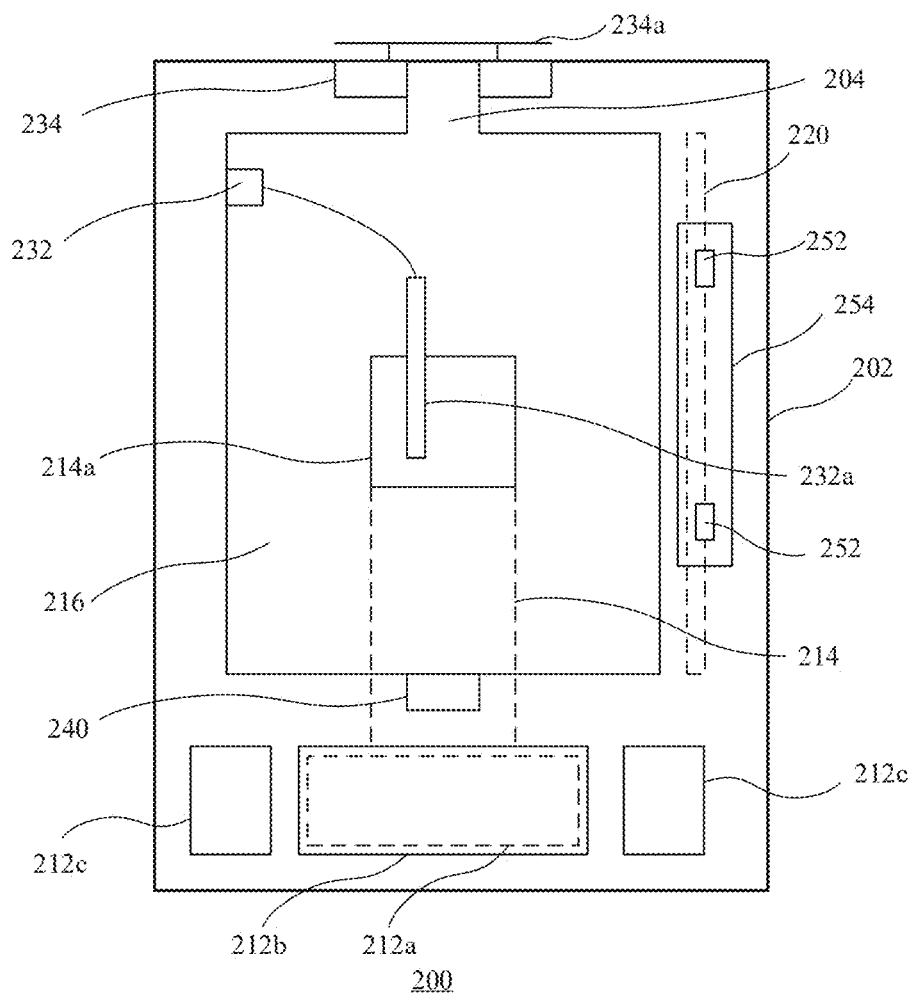
FIGS. 2A-2C illustrate an exemplary implementation of an infusion device in front view, side view and top view, respectively, according to one or more embodiments of the present disclosure.

In some embodiments, the sample processing system 110 can include a condenser 134, which is connected to the chamber 116 via a channel (e.g., an opening 204 as depicted in FIG. 2A). The condenser 134 can be integrated into the system 100, or it can be a separate component that connects to the system 100.

The control system 120 includes various components to control the operation of components in the sample processing system 110, such as, e.g., one or more processors 122, a memory 124, and a communication interface 126. The components in the control system 120 can be integrated into a control circuitry. Additionally and/or alternatively, the control system 120 can include discrete components that are coupled to each other through wired or wireless connections.

The one or more processors 122 can include any appropriate type of general-purpose or special-purpose microprocessor, digital signal processor, microcontroller, etc. The one or more processors 122 are configured to generate suitable control signals (e.g., electrical signals) according to instructions stored in the memory 124.

The memory 124 can be configured to store computer-readable instructions that, when executed by the one or more processors 122, can cause the one or more processors 122 to perform various operations disclosed herein. The memory 124 can be any non-transitory type of mass storage, such as, e.g., volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM.

The communication interface 126 can be configured to communicate information between the system 100 and other devices or systems, such as, e.g., a server or a terminal device in a connected environment. The communication interface 126 can include a local area network ("LAN") card to provide a data communication connection to a compatible LAN. As another further example, the communication interface 126 can include a high-speed network adapter such as, e.g., a fiber optic network adaptor, 10G Ethernet adaptor, or the like. Wireless links can also be implemented by the communication interface 126. In such an implementation, the communication interface 126 can send and receive electrical, electromagnetic or optical signals that carry digital data streams representing various types of information via a network. The network can typically include a cellular communication network, a Wireless Local Area Network ("WLAN"), a Wide Area Network ("WAN"), BLUETOOTH, or the like.

In some embodiments, the system 100 receives instructions on demand or through over-the-air (OTA) updates pushed by a server via the communication interface 126. The instructions can include recipes tailored for processing specific samples. The system 100 can store the received instructions in the memory 124.

In some embodiments, the system 100 connects to the internet through the communication interface 126 to automatically download parameter models (including power curves, temperature, time, weight, etc.). The system 100 then stores the downloaded parameter models in the memory 124. Users may choose new models at any time to operate the system 100 for infusing new samples (e.g., new plant species). The system 100 can link to electronic terminals such as, e.g., smartphones or personal computers (PCs) for data updates and/or presetting modes, providing users with greater operational flexibility.

The control system 120 generates suitable control signals to control the operation of components in the sample processing system 110 in accordance with the instructions stored in the memory 124. For example, the control system 120 controls the microwave generator 112 to produce microwaves with a specific wavelength(s) and/or a specific output power. The control system 120 can adjust the operation of the microwave generator 112 during the process of a sample. For example, the control system 120 can determine a change in one or more parameters for the microwave generator 112 according to information obtained from one or more sensors 132. The control system 120 can adjust the operation of the microwave generator 112 dynamically and/or periodically to ensure precise control of the sample processing.

In an embodiment, the control system 120 controls the operation of a motor integrated in the system 100. The motor can be included in the control system 120 or can be a separate component connected to the control system 120. The motor is used to drive a rotor to achieve stirring functionality. For example, the control system 120 generates control signals to drive the motor and rotate the rotor at a predefined speed for stirring. The rotor can be designed in various shapes and sizes according to specific use cases. The control components can adjust the corresponding rotational speed based on the rotor's structural parameters (e.g., size, shape).

In an embodiment, the control system 120 controls the operation of the condenser 134. For example, the control system 120 can instructs the condenser 134 to start operation at a prescribed time. Additionally and/or alternatively, the control system 120 can adjust the temperature, pressure, flow rate, or other suitable parameters to regulate the operation of the condenser 134. In some examples, the control system 120 can perform adjustments based on feedback from one or more sensors implemented to monitor the status of the condenser 134 and/or the sample processing system 110.

The feedback system 130 gathers pertinent information to monitor the status of the sample processing system 110 through the one or more sensors 132. The feedback system 130 provides the collected information to the control system 120, enabling the control system 120 to adjust the operation of the system 100. In some embodiments, the feedback system 130 can be part of the control system 120. Alternatively, the feedback system 130 can be include separate components that are connected to the control system 120.

The feedback system 130 can include various types of sensors. A sensor refers to a device that measures a parameter associated with a status of the system 100. For example, a temperature sensor measures temperature within the chamber 116, the sample 118 placed directly within the chamber 116, or the sample 118 placed within a container in the chamber 116 as further described hereinafter. A weight sensor, such as a scale, can be used to measure the weight of the sample 118 to be processed by the system 100, the combined weight of the sample 118 and its container (e.g., the container 300 depicted in FIG. 3A), and/or the weight of the system 100 with the sample 118 placed therein. In an embodiment, a sensor can be used to measure the speed of a rotor for monitoring the stirring process. It will be noted that other types of sensors can be utilized to provide relevant information to the control system 120, which are not limited by the present disclosure.

The one or more sensors 132 can be connected to the control system 120 via wired connections (e.g., cables, analog signal wires, buses, etc.). Additionally and/or alternatively, the one or more sensors 132 can be communicatively connected to the control system 120 through the communication interface 126 (e.g., utilizing a transceiver or similar communication components in the communication interface 126).

Figure 2B:
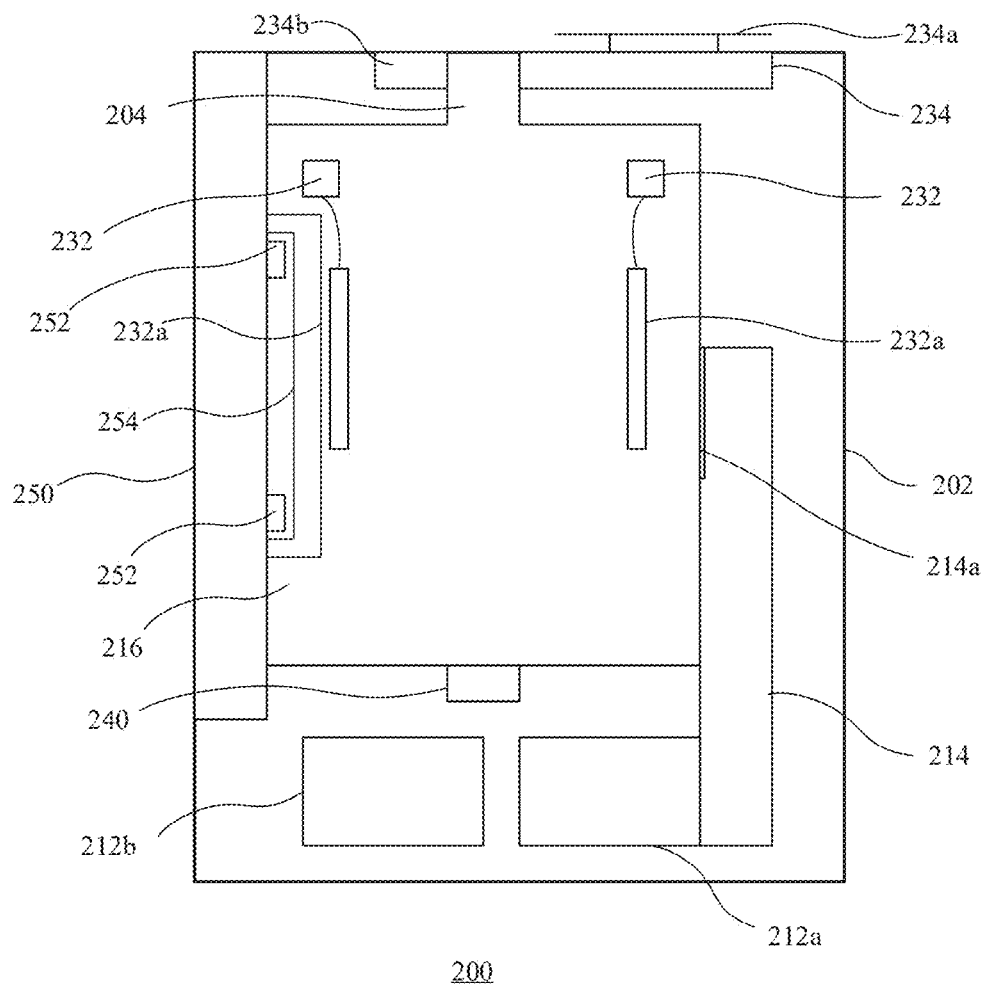
Figure 2C:
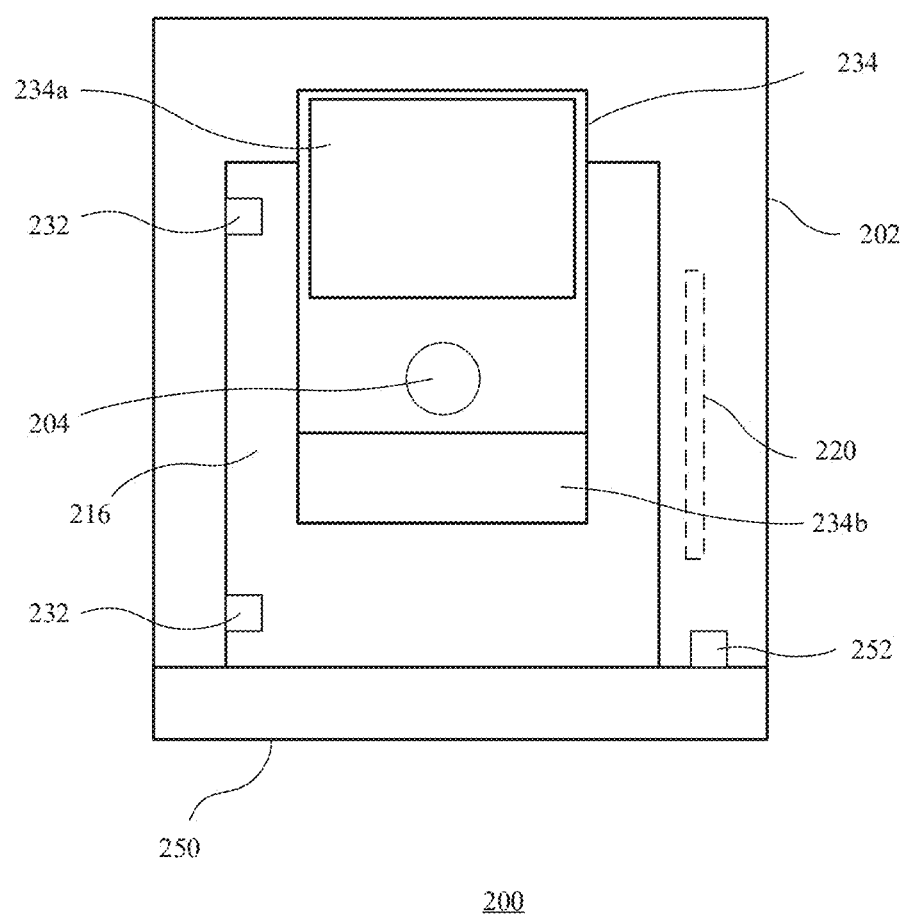

FIGS. 2A-2C demonstrate an exemplary implementation of an infusion device 200 from various perspectives, according to one or more embodiments of the present disclosure. The implementation shown in FIGS. 2A-2C provides an example arrangement of the components depicted in FIG. 1, resulting in an device 200 with a compact size and capable of achieving precise control over the sample processing.

FIG. 2A is a front view of the device 200. The device 200 has a main body 202, which contains a chamber 216 inside. The chamber 216 is formed by a top surface, a bottom surface, and side surfaces inside the main body 202. One of the side surfaces inside the main body 202 is a door (e.g., 202 in FIGS. 2B and 2C) that can be opened and closed to allow the placement of a sample inside the chamber 216.

Unlike conventional microwave devices with a left-right layout, the device 200 adopts a top-bottom layout. This top-bottom layout allows the chamber 216 to be arranged at substantially the horizontal center of the device 200 such that the device 200 has a left-right symmetrical appearance. As will be elaborated in further detail, in an embodiment, certain electronic components can be arranged in the bottom of the device 200 under the chamber 216 for stability. As a result, the vertical dimension of the device 200 can be greater than the horizontal dimension. Alternatively, the electronic components can also be arranged above the chamber 216 within the device 200. The design and/or arrangement of these components in the device 200 can also take into account other considerations, such as safety, interference, circuit layout efficiency, and more.

In an embodiment, the chamber 216 is connected to the outside through an opening 204 provided in the top surface of the chamber 216. The opening 204 allows excess steam to exit the chamber during certain processes. In another embodiment, the device 200 can not include any opening to the outside. In yet another embodiment, the device 200 can include more than one openings. Moreover, some or all of the openings can be covered or exposed during sample processing. It will be noted that the opening 204 can be of various shapes, such as, e.g., circular, square, etc., and can be set in any appropriate position and coupled with a condenser, which is further described hereinafter.

In an embodiment, the frame of the main body 202 surrounding the chamber 216 is at least two to three centimeters thick. The space created therein can prevent microwave leakage from the chamber 216 to the outside. As shown in FIG. 2A, the space between the right side of the chamber 216 and the outer shell of the main body 202 can be slightly thicker than the space on the left side. A door locking mechanism 254 can be installed on the right side. When the door 250 is closed, the door locking mechanism 254 latches into one or more keyholes 252 positioned on the frame. The door locking mechanism 254 operates in two steps. For example, when opening the door 250, the motor first unlocks the door 250 via button control, and then, the door can be pulled open. The motor and button control (and/or other suitable components) are integrated in the door locking mechanism 254. The door locking mechanism 254 can accommodate various types of locks, including electronic locks, magnetic locks, spring latches, and other suitable locking mechanisms.

Components associates with a microwave generator 112, such as, e.g., a magnetron 212a, a transformer 212b (e.g., for converting voltage and/or current signals), and cooling fans 212c, which typically have more weight than other components (e.g., the control circuitry 220) in the device 200, are located at the bottom of the device 200 to ensure the stability of the machine. As depicted in FIG. 2A, the cooling fans 212c can be placed on either or both sides of the magnetron 212a and the transformer 212b. This configuration allows for efficient heat dissipation from the magnetron 212a and/or the transformer 212b. In an embodiment, the cooling fan 212c can be arranged on the same side as the door locking mechanism 254, as this side has a thicker side frame providing more space due to the installation of the door locking mechanism 254.

The magnetron 212a is connected to a waveguide 214 integrated in the side frame (e.g., at the backside) of the main body 202. One end of the waveguide 214 connects to the magnetron 212a, while the other end connects to a microwave output port 214a disposed on the rear wall of the chamber 216, as depicted in FIG. 2A. The waveguide 214 directs the microwaves generated in the magnetron 212a to enter the chamber 216 through the microwave output port 214a. In this configuration, the generated microwave propagates inside the chamber 216 along a horizontal plane.

A motor 240 is arranged near the bottom surface of the chamber 240 to ensure coupling/connection with a rotor (e.g., rotor 304 in FIG. 3B, or rotor 51 in FIG. 4A) placed inside the chamber 216. The rotor is configured to rotate in a horizontal plane parallel to the propagation direction of the microwaves inside the chamber 216, thus minimizing interference from the microwaves.

As such, most of the electronic components are arranged at the bottom of the device 200, allowing for overall stability and an efficient circuit layout design.

A control circuit 220 (e.g., in a printed circuit board) is integrated in the side frame of the main body 202. The control circuit 220 can integrate components of the control system 120 as depicted in FIG. 1, such as, e.g., the processors 122, the memory 124, and/or the communication interface 126. The control circuit 220 is connected to the other components integrated in the device 200, such as, e.g., the magnetron 212a, the transformer 212b, cooling fans 212c, the motor 240, the door locking mechanism, the one or more temperature probes 232a, the scale 234, and more.

One or more temperature probes 232a can be installed in the chamber 216 or removed from the chamber 216 through corresponding connectors 232 at any suitable position in the chamber 216.

In some embodiments, the connectors 232 are constructed from metal components assembled together, with gaps between the metal joints. Microwave emissions directly from the output port 214a have high energy density (since microwaves enter the chamber 216 via the port 214a), especially in the direct emission zone. Direct contact with microwaves through these gaps significantly increases the risk of sparking. Therefore, the connectors 232 should be placed to avoid direct exposure to the microwave output from the microwave output port 214a. For example, the central positions both vertically and horizontally within the chamber 216 should be avoided.

In this example implementation as depicted in FIGS. 2A-2C, the connectors 232 can be arranged in the upper left portion inside the chamber 216, near the top left or front, avoiding the central position. For example, FIGS. 2A-2C depict an exemplary configuration for placing the connectors 232. The temperature probes 232a are connected to the control circuitry 220 (e.g., through the connectors 232) for transmitting the measurement results. In alternative embodiments, the connectors 232 may also be arranged in other places within the chamber 216, such as near the top-right corner, the bottom-right corner, or the bottom-left corner of the chamber 216, but are not limited to these locations.

In this configuration, the control circuitry 220 is positioned on the right side inside the side frame of the main body 202, as shown in FIG. 2A. Placing the connectors 232 on the same side increases the space required on this side. Therefore, the temperature connectors 232 are situated on the upper left inside the chamber 216 to utilize the available space effectively. This also allows convenient removal of the temperature probes 232a from the chamber 216.

A scale 234 is integrated or mounted on top of the main body 202. As shown in FIGS. 2B and 2C, the scale 234 is designed with a through hole that aligns with the opening 204. Additionally, the scale 234 includes a scale plate 234a for placing the sample for weighing, as well as a panel 234b for controlling and displaying. The scale plate 234a is removable, facilitating convenient installation and maintenance.

In some variations, the scale 234 can take other forms and be positioned at other suitable locations on the main body 202. For example, the scale 234 can be integrated into or attached to a top/bottom corner of the main body 202.

The scale 234 is connected to the control circuitry 220. The scale 234 is powered through the control circuitry 220 and transmits measurement results to the control circuitry 220. Upon receiving the measurement results from the scale 234, the control circuitry 220 determines suitable parameters for other components in the device 200 to operate according to a predetermined setup (e.g., a recipe). For example, before processing, the sample is weighed by the scale 234. Based on the weight measured by the scale 234, the control circuitry 220 determines parameters for the magnetron 212a for generating microwaves of a target output power according to a correspondence stored in the memory 124. In another example, the control circuitry 220 determines parameters for the motor 240 to facilitate stirring at a specific speed. The device 200 can automatically adjust a rotor speed (through the motor 240) for optimal sample processing (e.g., drying, extraction, or decarboxylation) based on the weight of the material being processed. The amount of solution and material can affect the efficiency of a rotor. For example, too little liquid at high speed can cause splashing, whereas too much liquid can lead to rotor displacement. The device 200 can automatically adjust to prevent these occurrences.

The rotor speed can be associated with various factors, such as the size and shape of the rotor, the capacity of the container, the amount of sample (or substance) to be processed, and more. In some embodiments, the control circuitry 220 can store predefined ranges corresponding to these factors.

Table 1 provides examples of rotor speed ranges, when a rotor with dimensions of 0.8 by 2.5 centimeters is used with a container that has a capacity of 1000 milliliters for processing a specific amount of substance mixed or dissolved in a specific amount of oil.

TABLE 1

| Container capacity: 1000 milliliters. | | |
| --- | --- | --- |
| Oil (in milliliters) | Substance (in grams) | Rotor speed range (in revolutions per minute) |
| 500 | 10 | 1500-2000 |
|  | 20 | 1500-2000 |
|  | 30 | 1600-2000 |
|  | 40 | 1700-2000 |
|  | 50 | 1800-2000 |
| 400 | 8 | 1500-1600 |
|  | 16 | 1600-1800 |
|  | 24 | 1500-1600 |
|  | 32 | 1500-1700 |
|  | 40 | 1600-1800 |
| 300 | 6 | 900-1200 |
|  | 12 | 1000-1200 |
|  | 18 | 1000-1400 |
|  | 24 | 1100-1500 |
|  | 30 | 1100-1600 |
| 200 | 4 | 600-800 |
|  | 8 | 700-800 |
|  | 12 | 700-800 |
|  | 16 | 800-900 |
|  | 20 | 800-900 |

Similar ranges can be defined for other conditions. The rotor speed ranges suggest optimized operational conditions in which the rotor speed remains relatively stable with no skipping or bouncing. Below the minimum value of the range, the center of the rotor becomes unstable and wobbles from side to side. Exceeding the maximum value of the range results in vortices, with higher sides and a lower center, causing the rotor to become unstable and leading to skipping and bouncing. The correspondence between the speed ranges and relevant factors can be prestored in the memory of the control circuitry 220. In some examples, the speed ranges are associated with one or more recipes prestored in the control circuitry 220.

In some examples, at a specific condition, the rotor can be controlled to operate within a sub-range of the range shown in Table 1. For example, according to Table 1, for a 30-gram substance in 500-milliliters of oil, the speed range can be between 1600 and 2000 revolutions per minute (rpm), such as, e.g., from 1700 to 2000 rpm, from 1800 to 2000 rpm, from 1900 to 2000 rpm, from 1600 to 1700 rpm, from 1600 to 1800 rpm, from 1600 to 1900 rpm, etc.

In some embodiments, the material to be processed and the container holding the material are weighed together, and the device 200 determines the corresponding recipe based on the total weight obtained. For example, the device 200 can be configured to use different standard containers for the corresponding processing. Thus, when a specific mode (e.g., drying, extraction, or decarboxylation) is selected, the device 200 can choose or adjust the recipe based on a prestored weight of the corresponding standard container for the selected mode. In some examples, each recipe (corresponding to a set of parameters with preset values) corresponds to a range of weights, allowing a specific recipe or its adjustment to be determined based on the measured weight falling within that range.

The system 100 and device 200 can operate in different modes to facilitate various sample processing methods, including, e.g., drying, extraction, decarboxylation, and/or distillation. The sample can be placed directly in the chamber (e.g., 116 or 216). In some embodiments, the sample can be placed in the chamber (e.g., 116 or 216) with a container. The container can be of various types that made of non-mental materials, such as, e.g., water cups, dining bowls, laboratory glassware, etc. In some embodiments, the sample can be placed in a specially designed container to facilitate other functions.

Figure 3A:
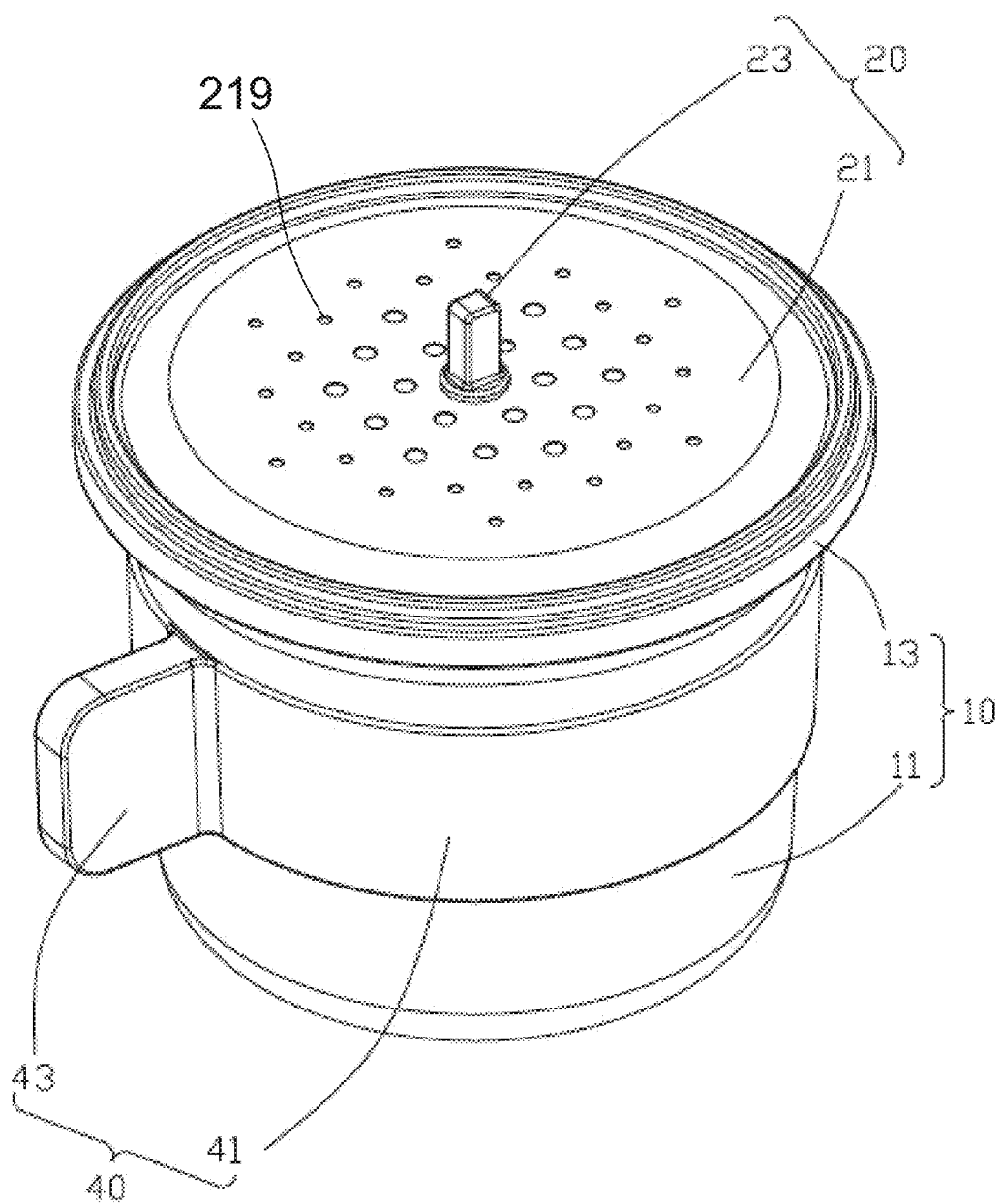
FIGS. 3A-3C illustrate an exemplary container, in accordance with one or more embodiments of the present disclosure.
Figure 3B:
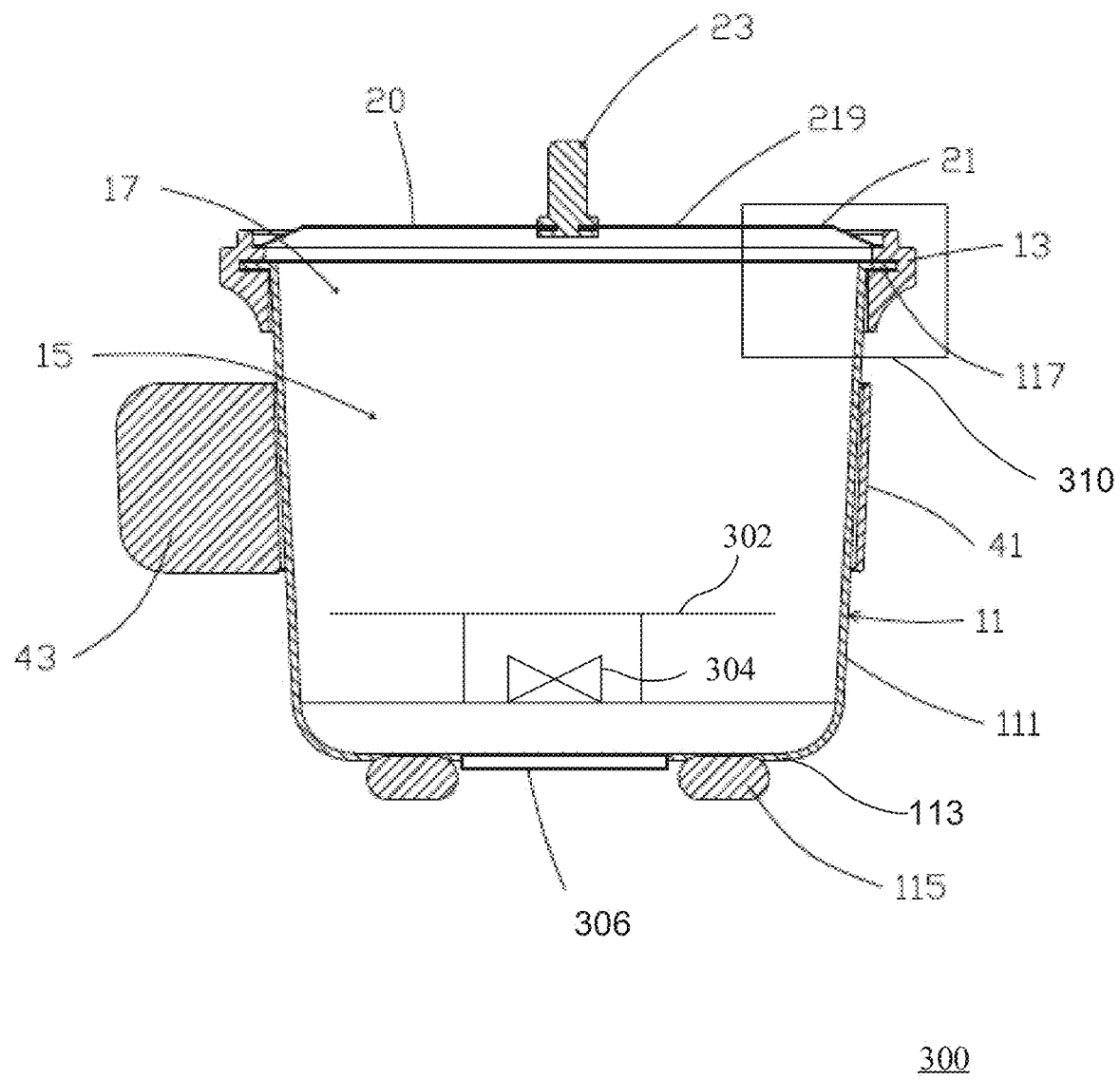
Figure 3C:
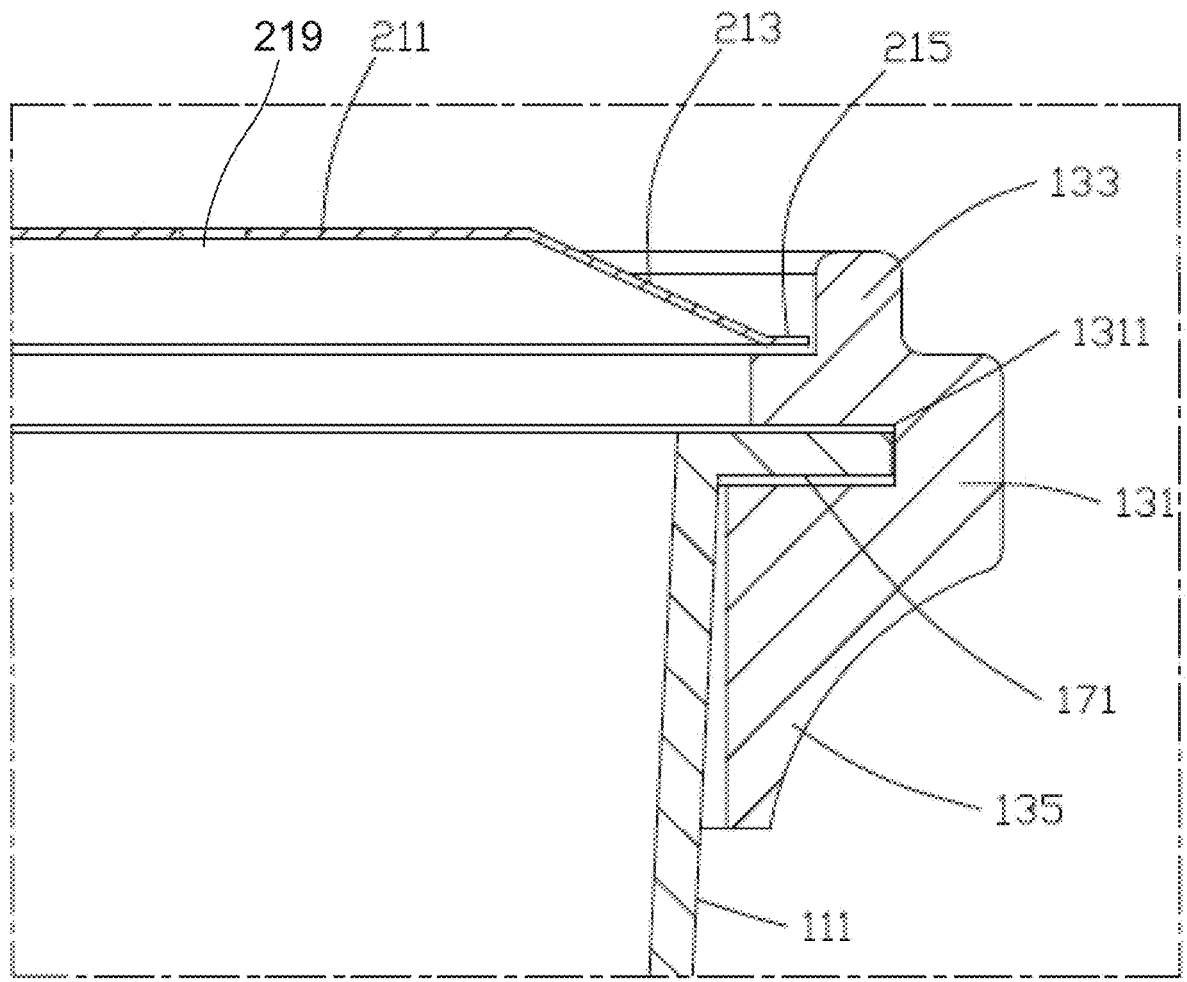

FIGS. 3A-3C illustrate an exemplary container 300, in accordance with one or more embodiments of the present disclosure. The container 300 can be used in connection with the system 100 or the device 200 for drying a sample. However, it will be noted that the container 300 can be place in other suitable devices/systems utilizing microwave for heating and/or drying.

As shown in FIG. 3A or 3B, the container 300 includes a body 10, a cover 20, and a sample holder 302.

The body 10 comprises a body 11 and a container edge 13. The body 11 is cylindrical with one side open, forming a container opening 17 on the open side and an inner cavity 15 inside. Through the container opening 17, the sample holder 302 can be placed inside the inner cavity 15, and further, materials can be placed in the placement component 30.

The body 11 includes a bottom wall 113, a side wall 111, and a protrusion 117. The bottom wall 113 and the side wall 111 form a box shape with one side open, with the side wall 111 rising from the bottom wall 113 and surrounding the bottom wall 113 to form the aforementioned inner cavity 15. The protrusion 117 is located at one end of the side wall 111 away from the bottom wall 113.

The body 11 can be made of microwave-transmitting material. However, it is noted that the body 11 can include a composite of microwave-transmitting material or microwave-insulating material with absorbing material. It is noted that microwave-insulating material does not have to completely block microwave transmission; it can also include low-transmission materials with a transmittance of from 0% to 10%, such as, e.g., from 1% to 10%, from 2% to 10%, from 3% to 10%, from 4% to 10%, from 5% to 10%, from 6% to 10%, from 7% to 10%, from 8% to 10%, from 9% to 10%, from 0% to 9%, from 0% to 8%, from 0% to 7%, from 0% to 6%, from 0% to 5%, from 0% to 4%, from 0% to 3%, from 0% to 2%, from 0% to 1%, etc. In some embodiments, the body 11 can include non-magnetic metals or non-metallic media, which are thermally conductive materials with good thermal conductivity sufficient for transferring heat, such as, e.g., copper, aluminum, etc. In some embodiments, the body 11 can include absorbing materials at the bottom wall 113 of the body 11. For example, the bottom wall 113 can be made of a material containing absorbing material, or absorbing material (e.g., 306 as shown in FIG. 3B) can be disposed onto the surface of the bottom wall 113 by fitting, coating, or fastening. In some embodiments, a portion of the side wall 111 can also include absorbing material. The absorbing material described herein refer to any material with a high microwave absorption rate sufficient for absorbing microwave energy to convert into heat, such as, e.g., graphite, silicon carbide, etc.

In an embodiment, an isolation part 115 is formed on the bottom of the body 11, to prevent overheating of the bottom wall 113 due to direct contact with the placement surface of the infusion system/device (e.g., the bottom surface of the chamber 216 as depicted in FIG. 2A or 2B). The isolation part 115 can be block-shaped as shown in FIG. 3B. However, it is noted that the shape of the isolation part 115 can be changed into other appropriate shapes, and one or more isolation parts 115 can be utilized. The isolation part 115 can be made of thermal insulation material, preventing other components from melting due to contact with the bottom wall 113. In some embodiments, the container 300 (e.g., the body 11) can not include any isolation parts 115.

The bottom wall 113 can be planar, though other configurations are also feasible. For example, the bottom wall 113 can include one or more curved surfaces or irregular surfaces. The side wall 111 can extend in a straight line and connect the bottom wall 113 and the protrusion 117. However, it will be noted that other configurations are also feasible. For example, the side wall 111 can extend in a curved line or a combination of curved and straight lines. Furthermore, the orientation of the protrusion 117 is not limited as long as it intersects with the side wall 111. For example, the protrusion 117 can protrude towards the inner cavity 15 of the body 10. Moreover, the shape of the protrusion 117 is not limited as long as it can be installed in conjunction with the container edge 13. In some embodiments, the container 300 may not include the protrusion 117. In this configuration, the side wall 111 can be directly installed in conjunction with the container edge 13. For example, an end portion on the side of the side wall 111 can be directly installed in conjunction with the container edge 13.

FIGS. 3B and 3C demonstrate the container edge 13 installed in conjunction with the protrusion 117 at the container opening 17. FIG. 3C magnifies the region 310 from FIG. 3B. The container edge 13 includes a first abutment portion 131, a second abutment portion 133, and a third abutment portion 135. The first abutment portion 131 is U-shaped, with its opening facing the protrusion 117, and a groove 1311 matching the protrusion 117 is formed inside. The second abutment portion 133 extends from the first abutment portion 131 towards the side wall 111 of the box main body 11 and abuts against the side wall 111. The third abutment portion 135 extends from the first abutment portion 131 towards one side away from the second abutment portion 133 and abuts against the cover 20. It is understood that in some embodiments, the second abutment portion 133 and the third abutment portion 135 can be omitted. The container edge 13 can be made of insulating material, such as, e.g., silicone, rubber, plastic, etc., to prevent sparking when the cover 20 contains non-magnetic metal while the body 10 contains non-magnetic metal.

Referring to FIG. 3A, the cover 20 has a lid 21 and a handle 23. The handle 23 grips the lid 21 and is made of heat-resistant insulation materials such as, e.g., silicone, rubber, plastic, wood, etc. The handle 23 can be positioned at the geometric center, center of gravity, or any arbitrary point on the lid 21. The lid 21 is made of microwave-insulating material, with a plurality of through holes 219 to prevent microwaves from entering the inner cavity 15. The through holes 219 can adopt various suitable designs to block microwaves. For example, the through holes 219 can be small enough to allow very little or no microwave energy to enter the inner cavity 15. Alternatively, the through holes 219 can be inclined or curved relative to the vertical direction, making it difficult for microwaves to pass through the through holes 219 into the inner cavity 15. The through holes 219 can be arranged according to a predefined pattern or randomly. The size of the through holes 219 can be uniform or varied. For example, in some embodiments, the area occupied by the through holes 219 on the lid 21 can be 50% or more, such as, e.g., from 55% to 100%, from 60% to 100%, from 65% to 100%, from 70% to 100%, from 75% to 100%, from 80% to 100%, from 85% to 100%, from 90% to 100%, from 95% to 100%, from 50% to 95%, from 50% to 90%, from 50% to 85%, from 50% to 80%, from 50% to 75%, from 50% to 70%, from 50% to 65%, from 50% to 60%, from 50% to 55%, etc. The arrangement of the through holes 219 can align with the position of the material, such as, e.g., overlapping with the location of the sample holder 302. Additionally, the size and density of the through holes 219 can be adjusted based on the depth distribution of the sample holder 302 where the material is placed. In this regard, liquid medium can be evaporated and quickly discharged from the container 300 through the through holes 219.

In some embodiments, one or more temperature probes (e.g., temperature probe 232a as depicted in FIG. 2A) can be inserted into the container 300 via one or more through holes 219 in the lid 21. In this configuration, the temperature inside the container 300 can be measured and used to adjust the sample processing. The one or more temperature probes, when inserted into the one or more through holes 219 in the lid 21, are hold in place to prevent contact with metal parts (such as a metal part in the cover 20 or a metal part of the body 10). For example, the temperature probe(s) can be inserted into a fixing part 32 as depicted in FIG. 4C, which can include or be coupled to a protruding part that can be secured to a section of lid 21. In some embodiment, the handle 23 can be configured to receive the temperature probe that extend through the handle 23 into the container 300. For example, the handle 23 can include a through hole that receives and holds the temperature probe in place so as to prevent the temperature probe from contacting other metal parts. As another example, a portion of the handle 23 can be removed after the cover 20 is replaced. The remaining portion of the handle 23 on the cover 20 can include a through hole for receiving and holding the temperature probe in place.

As shown in FIG. 3C, the lid 21 includes a covering part 211, a connecting part 213, and a cover abutment part 215. The covering part 211 is used to cover the material in the inner cavity 15. The handle 23 and some or all of the through holes 219 are arranged on the covering part 211. One end of the connecting part 213 is connected to the covering part 211, and the other end is connected to the cover abutment part 215. The connecting part 213 can extend at an angle or in a curved manner, and the direction and slope of the extension can be changed as needed. One end of the cover abutment part 215 is connected to the connecting part 213, and the other end, which is on the side away from the handle 23, contacts the second abutment portion 133. Additionally, in this embodiment, the bottom surface of the handle 23 abuts against the first abutment portion 131. However, the bottom surface of the cover abutment part 215 can abut against any part of the container edge 13.

Furthermore, in some embodiments, the connecting part 213 and the cover abutment part 215 can be omitted. In this configuration, the covering part 211 can extend to the second abutment portion 133 to act as the cover abutment part 215.

The sample holder 302 is placed in the inner cavity 15 and configured to hold the material to be dried. In an embodiment, the sample holder 302 can include a mesh for placing the material. The mesh part 302 can be made of various materials, such as, e.g., non-thermal conductive materials or thermal conductive materials. The mesh in the sample holder 302 can be spaced from the bottom wall 113 of the body 10. This prevents the bottom of the mesh, which holds the material, from directly contacting the bottom wall 113 of the body 10, thereby avoiding overheating the material at the bottom of the mesh. In an embodiment, the mesh that holds the material is also spaced from the side wall 111 of the body 10.

In some embodiments, the outer surface of the non-magnetic metal discussed above can include a dielectric coating. The material for the dielectric coating can be selected from one or more of glass, ceramic, Teflon, polyethylene, and/or any suitable combination thereof. The non-magnetic metal can be made from at least one of copper, aluminum, zinc, and/or any suitable combination thereof.

The container 300 can be used to dry a sample when operating with an infusion device (e.g., the infusion system/device disclosed herein) that provides microwave energy. To dry the sample using the container 300, the sample is placed on the sample holder 302 that is placed inside the cavity 15 of the container 300, and then the container 300 is covered with the cover 20. Next, the container 300 containing the sample is placed inside the infusion device. During operation, the microwaves generated by the infusion device are absorbed by the absorptive material contained in the bottom wall 113 (and/or the side wall 111) to generate heat. The heat is transferred to other parts of the container body 11 (e.g., the bottom wall 113), and part of the heat is transmitted to the sample inside the cavity 15. In this process, the moisture and other media contained in the sample are heated and evaporated from the sample. The evaporated medium is expelled to the outside of the container 300 via the through holes 219 on the lid 21. This way, the sample is dried.

In an embodiment, a rotor 304 can be disposed at the bottom of the cavity 15. The rotor 304 can be driven by the motor (e.g., 240 as depicted in FIG. 2A or 2B) to rotate inside the cavity 15. This promotes air circulation within the cavity 15, thereby achieving more uniform and efficient heating of the sample.

In an embodiment, the infusion device 200 (or the infusion system 100) is used to dry the sample contained in the container 300. Before placing the sample in the container 300, the sample can first be weighed by the scale 234. Based on the measured weight, the control circuitry 220 can determine one or more suitable parameters to operate one or more components in the device 200 according to a correspondence (e.g., a recipe) prestored in the memory. For example, the control circuitry 220 determines an output power for the magnetron 212a and/or a rotation speed for the motor 240. One or more temperature probes 232a can be connected to the container 300 or any other spot within the chamber 216. The device 200 operates according to one or more parameters determined by the control circuitry 220. During the drying process, the control circuitry 220 can monitor the temperature status based on measurements from the one or more temperature probes 232a. Additionally, the control circuitry 220 can adjust the operation of certain components (e.g., the magnetron 212a and/or the motor 240) therein based on the measurement results from the sensor. This allows the device 200 to achieve uniform heating and efficient drying of the sample.

Figure 4A:
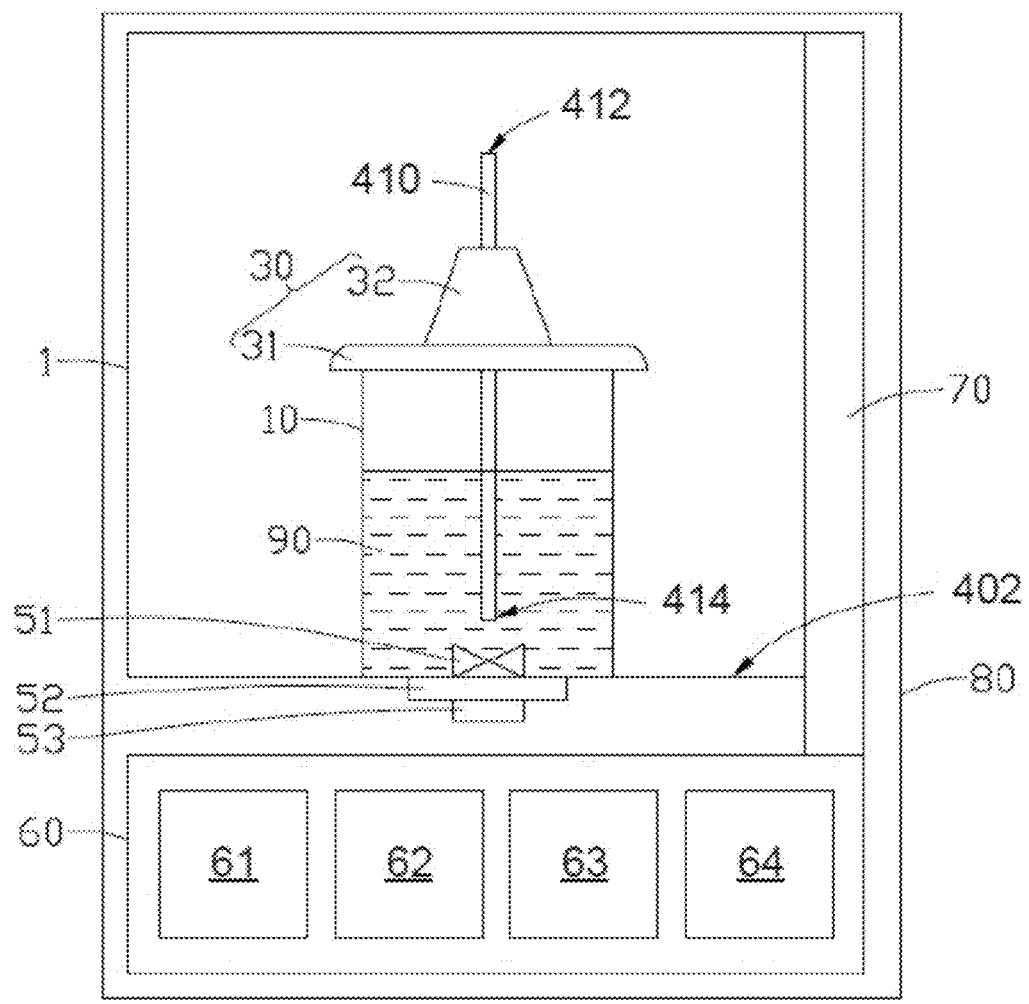
FIG. 4A is a schematic illustrating another infusion device for substance extraction, in accordance with one or more embodiments of the present disclosure.

FIG. 4A is a schematic illustrating another infusion device 400 for substance extraction, in accordance with one or more embodiments of the present disclosure. The device 400 can include some or all of the components and/or functions of the infusion system 100 or the infusion device 200. This example demonstrates an exemplary setup for extraction operation performed by the device 400.

As shown in FIG. 4A, the device 400 includes a main body 80, a controller 60, and a waveguide 70 for transmitting microwaves.

A cavity 1 is provided in the main body 80. A sample to be processed 90 is placed on the bottom surface 402 of the cavity 1. In this example, the sample 90 is contained in a container 10.

In this implementation, a magnetic field generator 52 and a motor 53 are integrated in the frame of the main body 80. The motor 53 is controlled by the motor control processor 62. The magnetic field generator 52 is configured to generate two or more magnetic fields with different polarities and is connected to an output end of the motor 53. The magnetic field generator 52 is coupled to a magnetic rotor 51 placed proximate to the bottom surface 402 of the cavity 1. The magnetic rotor 51 is placed at the bottom of the container 10 within the sample solution 90. The magnetic rotor 51 has two polarities. When the motor 53 operates, the magnetic field generator 52 rotates, generating an alternating magnetic field across the rotor 51. This induces varying electromagnetic currents in the magnetic rotor 51, causing it to rotate and thereby stirring the sample solution 90.

However, it will be noted that other suitable components can be utilized to generate an alternating magnetic field. Additionally and/or alternatively, other suitable techniques can be utilized to stir the sample to achieve similar technical effect.

The controller 60 is integrated in the frame of the main body 80, and is used to control the operation of various components of the device 400. The controller 60 includes various components, such as, e.g., a temperature control processor 61, a motor control processor 62, and a microwave generator 63 configured to generate microwaves, and a power control unit 64.

The microwave generator 63 includes a magnetron configured to generate microwaves. The microwave generator 63 produces the microwaves at a set output power.

The power control unit 64 can be configured to adjust an input voltage of the microwave generator 63. For example, the power control unit 64 includes a transformer for adjusting the input voltage of the microwave generator 63 according to one or more parameters such as temperature provided by a temperature probe 410.

Thus, the power control unit 64 can adjust the output power of the microwave generator 63, thereby controlling the heating temperature of the sample 90.

The microwave generator 63 is connected to a waveguide 70 arranged on one surface (e.g., a sidewall) of the cavity 1. The microwave generated by the microwave generator 63 is transmitted to the waveguide 70. The waveguide 70 directs the microwave generated by the microwave generator 63 to enter the cavity 1. In an embodiment, the waveguide 70 can be arranged near the back surface of the cavity 1 opposite to the front door of the device 400, so that the microwave generated by the microwave generator 63 enters the cavity 1 from the back surface of the cavity 1. This design can further allow a compact size of the device 400 in the horizontal direction.

The temperature control processor 61 is connected to one or more temperature sensors in the cavity. The one or more temperature sensors (e.g., a temperature probe 410) can be utilized to measure temperature in the sample 90 and/or the cavity 1. The temperature control processor 61 receives measurement results from the one or more temperature sensors. In some examples, the temperature control processor 61 can cause display of the temperature information on a display (e.g., a display panel integrated in the main body 80, a display of a terminal device, etc.). The device 400 can inform the user of the current heating situation. In some instances, the temperature control processor 61 can cooperate with other components in the controller 60 to change or adjust the operation of those components. For example, the temperature control processor 61 can be connected to the power control unit 64 and/or the microwave generator 63 to adjust the heating temperature of the sample 90.

In an example, the container 10 contains a mixture of liquid medium and the material to be infused 90. The container 10 can be made of a material that can penetrate microwaves. Additionally, an opening (not shown) is provided on the side of the container 10 facing away from the surface 11, which is used for introducing the sample 90 (e.g., the mixture containing the processed material). The shape of the container 10 is not limited to a U-shaped cross-section and can be set arbitrarily.

A fixing component 30 is used to fix a temperature probe 410 at a predefined position in the container 10 so that the temperature probe 410 detects the internal temperature of the container 10. The fixing component 30 includes a cover 31 that covers the opening side of the container 10, and a fixing part 32 arranged on the upper surface 311 of the cover 31.

In an embodiment, the heating temperature of the sample 90 can be controlled by continuously adjusting the output power of the microwave generator 63. For example, the heating temperature of the sample 90 can be set to 80 Degree Celsius according to a user input. At the beginning of the heating process, the power control unit 64 can control the microwave generator 63 to generate the microwaves at 100% output power. When the heating temperature reaches 81 Degree Celsius as indicated by signals from the temperature probe 410, the power control unit 64 can continuously reduce the output power of the microwave generator 63 so as to prevent the heating temperature of sample 90 from going further up. When the heating temperature decreases to 79 Degree Celsius as indicated by signals from the temperature probe 410, the power control unit 64 can continuously increase the output power of the microwave generator 63 so as to prevent the heating temperature of sample 90 from going further down.

In another embodiment, heating temperature of the sample 90 can be controlled by a step adjustment of the output power of the microwave generator 63. For example, the heating temperature of the sample 90 can be set to 80 Degree Celsius according to a user input. At the beginning of the heating process, the power control unit 64 can control the microwave generator 63 to generate the microwaves at 100% output power. When the heating temperature reaches 81 Degree Celsius as indicated by signals from the temperature probe 410, the power control unit 64 can reduce the output power of the microwave generator 63 by steps so as to prevent the heating temperature of sample 90 from going further up. For example, the power control unit 64 can decrease the output power of the microwave generator 63 from 100% by 10% for each step until the heating temperature reaches a desired value. When the heating temperature decreases to 79 Degree Celsius as indicated by signals from the temperature probe 410, the power control unit 64 can increase the output power of the microwave generator 63 by steps so as to prevent the heating temperature of sample 90 from going further down. For example, the power control unit 64 can increase the output power of the microwave generator 63 from 30% by 10% for each step until the heating temperature reaches a desired value.

The simplest form of the step adjustment described above is a binary adjustment. For example, when the heating temperature reaches 81 Degree Celsius as indicated by signals from the temperature probe 410, the power control unit 64 can reduce the output power of the microwave generator 63 to 0% by turning off the microwave generator 63. When the heating temperature decreases to 79 Degree Celsius as indicated by signals from the temperature probe 410, the power control unit 64 can turn on the microwave generator 63 to its full output power.

Figure 4B:
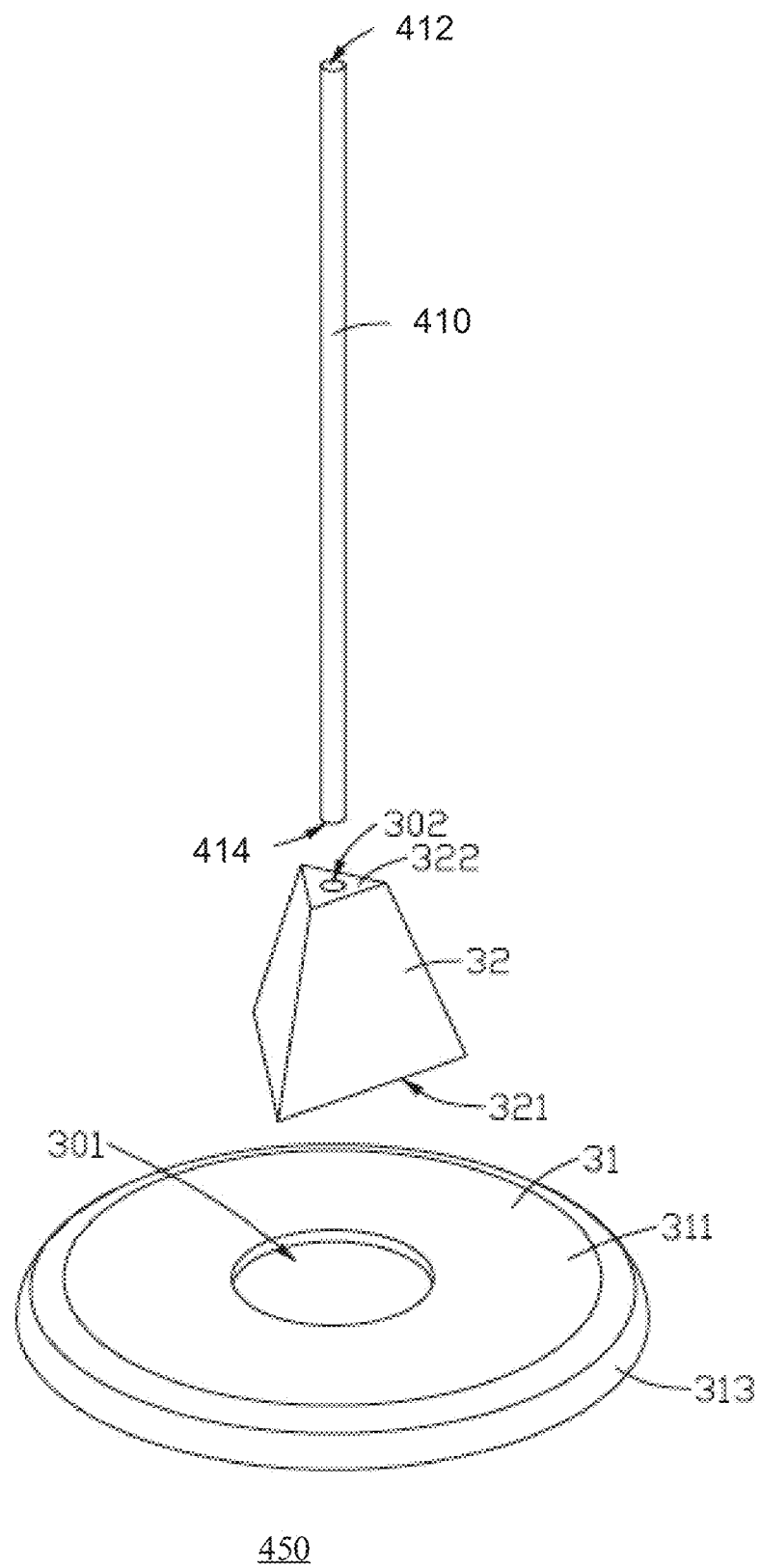
FIG. 4B is an exploded view of an exemplary implementation of the fixing component as shown in FIG. 4A.
Figure 4C:
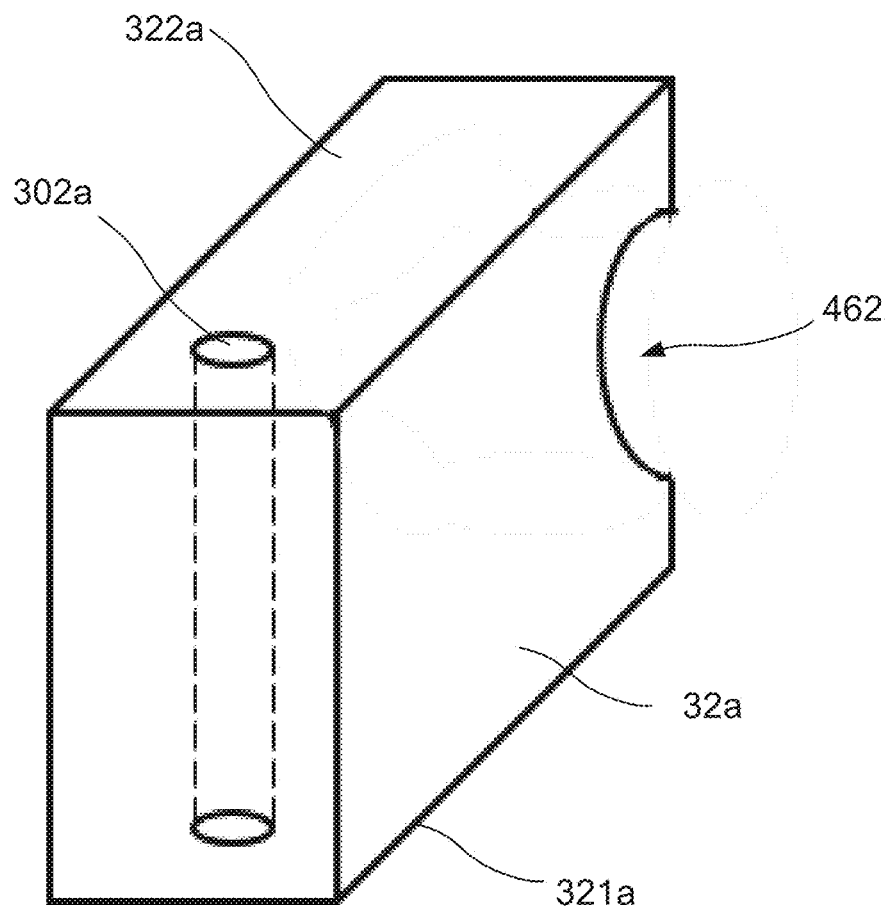
FIG. 4C illustrates an alternative implementation of the fixing part as shown in FIG. 4B, in accordance with one or more embodiments of the present disclosure.

FIG. 4B is an exploded view of an exemplary implementation 450 of the fixing component 30 as shown in FIG. 4A.

As shown in FIG. 4B, the cover 31 is disk-shaped and includes a first through hole 301 that penetrates at the central position. The first through hole 301 can be circular. However, it will be noted that the first through hole 301 is not limited to the circular shape and can be set in other appropriate configurations (e.g., positions other than the center of the cover 31) as long as the space of the first through hole 301 is sufficient for the temperature probe 40 to pass through freely.

The edge of the cover 31 includes a blocking wall 313 that bends and extends towards the container 10. The blocking wall 313 can prevent the cover 31 from shifting due to movement, handling of the container 10, or boiling of the sample solution 90. However, it will be noted that other suitable structures, such as, e.g., a clamping wall, threaded mounting wall, etc., can be used.

The fixing part 32 covers the first through hole 301 of the cover 31. The fixing part 32 has a first surface 321, a second surface 322, and a second through hole 302. The first surface 321 abuts the upper surface 311 of the cover 31. The second surface 322 is located away from the first surface 321 and has a smaller area than the first surface 321. The second through hole 302 penetrates from the first surface 321 to the second surface 322. The cross-section of the fixing part 32 decreases from the first surface 321 towards the second surface 322. For example, in some embodiments, the cross-section of the fixing part 32 gradually decreases from the first surface 321 towards the second surface 322, forming a truncated pyramid or truncated cone shape as shown in FIGS. 4A and 4B. The side surfaces of the truncated pyramid or truncated cone can include inclined surfaces, curved surfaces, or other suitable shapes. In some embodiments, the cross-section of the fixing part 32 decreases in steps from the first surface 321 to the second surface 322, resulting in stepped side surfaces. In some embodiments, the side surfaces include both stepped and gradually decreasing parts. It is noted that the shape and size of the first surface 321 and the second surface 322 of the fixing part 32 can be set arbitrarily, as long as the first surface 321 does not pass through the first through hole 301.

The second through hole 302 connects the first surface 321 and the second surface 322 and fits tightly with the temperature probe 410. In other words, the second through hole 302 allows the temperature probe 410 to be inserted under force and holds the temperature probe 410 so that it does not move up and down in the second through hole 302. The wall of the second through hole 302, particularly where it interfaces with the temperature probe 410, includes elastic insulating material. This design can, e.g., help prevent damage to the temperature probe 410 during insertion and removal, allowing it to be securely held in the second through hole 302. Moreover, the elastic insulating material can prevent heat accumulation that could affect the temperature detection of the temperature probe 410. Furthermore, the second through hole 302 can extend along an axis perpendicular to the first surface 321 and through the center of the second surface 322, so that even if the container 10 moves or rotates, the fixing part 32 can stably hold the temperature probe 410.

The cover 31 and the fixing part 32 can be made of any material that allows penetration of microwaves. The cover 31 and the fixing part 32 can be integrally formed or separately formed.

By fixing the fixing component 30, the temperature probe 410 is fixed at a predefined position in the container 10, with one end 414 extending into the container 10, a middle part positioned inside the second through hole 302 of the fixing part 32, and the other end 412 located above the fixing part 32. The temperature probe 410 can adopt existing structures. For example, the temperature probe 410 can be long and tubular, with two opposite ends, such as, e.g., a first end 414 and a second end 412. The first end 414 is placed close to the surface 402, and the first end 414 contacts the sample solution 90. The second end 412 is connected to the controller 60 (e.g., the temperature control processor 61), configured to send the detected temperature to the controller 60. The temperature probe 410 can be perpendicular to the surface 402 but can also be inclined as long as it does not contact any part of the container 10.

FIG. 4C illustrates an alternative implementation 460 of the fixing part 32 as shown in FIG. 4B, in accordance with one or more embodiments of the present disclosure. In this example, the fixing part 32*a* has a first surface 321*a*, a second surface 322*a*, and a second through hole 302*a*. Unlike the design of the fixing part 32 as depicted in FIG. 4B, the first surface 321*a* and the second surface 322*a* of the fixing part 32 have the same area, and the side walls between these two surfaces form a 90-degree angle with the surfaces. Similar to the second through hole 302 as depicted in FIG. 4B, the temperature probe 410 can be inserted into the second through hole 302*a* in the fixing part 32*a* and held in place for temperature measurement. Additionally, the fixing part 32*a* can be designed with a notch 462 to hold the connector (e.g., connector 232 as depicted in FIG. 2A) attached to one end of the temperature probe 410 when the connector is removed from the infusion system/device. The notch 462 can be of various shapes, locations, and numbers, which are not limited by the present disclosure.

The designs of the fixing part (e.g., 32 or 32*a*) and the cover (e.g., 31) described herein are merely examples. It should be noted that other shapes, sizes, and structures can also be used. The three-part design described here, which includes a separate and combinable temperature probe (e.g., 410), fixing part (e.g., 32 or 32*a*), and cover (e.g., 31), allows these components to be configured in various combinations as needed (e.g., based on size requirements) to achieve a broader range of applications.

When the device 400 operates in the extraction mode, microwaves generated within the chamber 1 cause the sample (e.g., the solution 90 contained in the container 10) to heat up. During the heating process, the rotor 51 is continuously rotated by the motor 53 to ensure uniform heating of the solution and uniform concentration of extracted components. The temperature probe 410 continuously monitors the solution temperature and provides feedback to the controller 60. When the temperature reaches the set value, the controller 60 can gradually reduce the power of the microwave generator 63 (e.g., a magnetron) through the power control unit 64, thereby maintaining the solution within a specified temperature range, as described in greater details above.

When the device 200 is used for extraction, before placing the sample inside the chamber 216, the sample 90 can be weighed by the scale 234. Based on the measured weight, the control circuitry 220 can determine a set of parameters to control the extraction operation, so that the extraction is optimized based on the weight of the sample.

In an embodiment, the infusion systems/devices and/or containers disclosed in the present disclosure can be used for other sample processing.

For example, the infusion system/device provided herein can operate in a decarboxylation mode, for example, for processing plant matters. Decarboxylation aims to convert THCA components in the material into THC by removing the carboxyl group (—COOH). The principle involves exposing the material to a specific high temperature environment for a certain period to achieve decarboxylation. Utilizing the high-temperature function provided by the infusion system/device provided herein can achieve this purpose.

In an example, a sample is placed in a container (e.g., the container 300 as depicted in FIGS. 3A-3C or other suitable containers), which is then placed in the infusion device 200 (or the infusion device 400) for decarboxylation. During decarboxylation, the device 200 can first operate at a full power, rapidly raising the temperature inside the container. After a period of time, the power is gradually reduced and eventually maintained at low power until the process is complete. The power control process as described in greater details above in connection with the microwave generator 63 and the power control unit 64 is used to prevent the temperature inside the container from becoming too high, thereby maintaining it at a target temperature level. In accordance with embodiments of the disclosure, the approach can achieve, e.g., optimal decarboxylation results.

In another example, the infusion system/device provided herein can be used for collecting essential oil. The process involves heating the sample to generate steam and directing the generated steam to a condenser (e.g., the condenser 134 as depicted in FIG. 1). The condenser then cools the steam and separates different components to obtain the essential oil product in layers. For example, a condenser can be connected to the infusion device 200 via the opening 204. As such, the steam exiting from the chamber 216 can be collected by the condenser then condensed into oil.

In some embodiments, the infusion systems/devices provided in the present disclosure can be utilized to facilitate sample processing across different stages and through different modes. The corresponding recipes can be restored in the infusion systems/devices, allowing users to conveniently access them at any time. Additionally, the infusion systems/devices can automatically adjust the existing recipes based on the weight of the sample to be processed, achieving optimized performance.

In some embodiments, the infusion systems/devices can be used to extract cannabinoids. When preparing the sample, pre-processed hemp or *cannabis* flower and leaf raw materials are mixed with suitable edible oil, such as, e.g., olive oil, coconut oil, peanut oil, rapeseed oil, soybean oil, honey, or butter. The mixed sample is placed in a container and the container is placed in an infusion system/device (e.g., the infusion device 200). A temperature probe (e.g., 232a as shown in FIG. 2A) is inserted into the container to measurement the temperature of the sample. A rotor (e.g., 51 as shown in FIG. 4A) is placed inside the container. A condenser (e.g., 134 as shown in FIG. 1) is connected to the infusion system/device (e.g., through the opening 204). The infusion system/device can retrieve the parameters based on the prestored recipes to run the process. Alternatively, the infusion system/device can setup the process based on user inputs. In some examples, the infusion system/device can adjust the parameters based on a measured weight of the sample. For example, the infusion system/device sets the output power for the microwave to 800 watts, the temperature for extraction to 130 Degree Celsius, the extraction time to 30 minutes, and the rotation speed for the rotor to 200 revolutions per minute or higher. The infusion systems/devices can obtain the cannabinoids through the controlled process disclosed herein. For example, the set of parameters can be stored in the infusion systems/devices corresponding to a specific sample or target end product (e.g., cannabinoids) with a reference weight (or a reference weight range) under a specific mode (e.g., the decarboxylation mode). It will be noted that other suitable recipes can be prestored in the infusion systems/devices. Additionally, the recipes prestored in the infusion systems/devices can be removed and/or updated.

It is noted that the techniques described herein can be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device can read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including, e.g., a portable compact disc (CD), a portable digital video disc (DVD), etc.

It should be understood that the arrangement of components illustrated in the attached Figures are for illustrative purposes and that other arrangements are possible. For example, one or more of the elements described herein can be realized, in whole or in part, as an electronic hardware component. The elements can be implemented in software, hardware, or a combination of software and hardware. Moreover, some or all of these other elements can be combined, some can be omitted altogether, and additional components can be added while still achieving the functionality described herein. Thus, the subject matter described herein can be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B, and C.

What is claimed is:

1. A home appliance for substance processing using microwave, comprising:
    a temperature sensor;
    a microwave generator configured to generate microwave;
    a main body providing a chamber with a side opening, wherein the microwave generator is situated beneath the chamber, and the substance is placed inside the chamber during process;
    a door fixed on a first side frame of the main body, wherein the door can be closed to cover the side opening of the chamber in the main body;
    a waveguide integrated in a rear frame of the main body, the waveguide being connected to the microwave generator and configured to direct the microwaves into the chamber through an output port located at a rear surface of the chamber; and
    a weighing sensor integrated in the main body;
    a motor situated beneath the chamber and proximate to a bottom surface of the chamber; and
    a controller coupled to the temperature sensor and the microwave generator and configured to control an operation of the microwave generator based on a measurement of the temperature sensor for processing the substance,
    wherein the temperature sensor is removably attachable to a first side surface of the chamber, and the first side surface of the chamber is an interior surface of the first side frame of the main body,
    wherein the controller is integrated in the main body and configured to:
        obtain measurements from the weighing sensor and the temperature sensor; and
        adjust, based on the measurements, the operation of the microwave generator,
    wherein the motor is configured to drive a rotor when the rotor is placed inside the chamber, and
    wherein the controller is further configured to adjust, based on the measurements, a rotational speed of the rotor through the motor.

2. The home appliance according to claim 1, further comprising:
    a weighing sensor coupled to the controller,
    wherein the controller is further configured to control an operation of the microwave generator based on a measurement of the weighing sensor for processing the substance.

3. The home appliance according to claim 2, further comprising:
    a motor coupled to the controller and configured to drive a rotor placed inside the substance,
    wherein the controller is further configured to adjust, based on at least one of the measurement of the weighing sensor and the measurement of the temperature sensor, a rotational speed of the rotor through the motor.

4. The home appliance according to claim 1, further comprising:
    one or more cooling fans adjacent to the microwave generator and configured to dissipate heat from the microwave generator.

5. The home appliance according to claim 1, further comprising:
    a two-step door locking mechanism integrated in a second side frame of the main body,
    wherein the second side frame and the first side frame are on opposite sides of the main body.

6. The home appliance according to claim 1, wherein the weighing sensor is integrated in a top frame of the main body.

7. The home appliance according to claim 1, wherein the controller further comprises:
    one or more processors:
    a memory storing instructions executable by the one or more processors; and
    a transceiver configured to receive parameter models associated with one or more recipes,
    wherein the memory is configured to store the parameter models associated with one or more recipes, and
    wherein the one or more processors are configured to:
        determine, for the substance, a set of parameters corresponding to a parameter model associated with a recipe of the one or more recipes; and
        determine, based on the measurements, an adjustment to one or more parameters in the set of parameters for processing the substance.

8. The home appliance according to claim 1, wherein the main body comprises an opening in a top frame, the opening serves as a channel, allowing air communication between inside and outside the chamber, and wherein the opening does not allow the microwaves to pass through.

9. The home appliance according to claim 8, further comprising:
    a condenser connected to the main body through the opening,
    wherein the condenser is configured to collect steam from the chamber.

* * * * *